(12) United States Patent
Nguyen

(10) Patent No.: US 8,424,126 B2
(45) Date of Patent: Apr. 23, 2013

(54) CONTROLLABLE TOILET FLUSHING APPARATUS

(76) Inventor: Trung T Nguyen, Plano, TX (US)

( * ) Notice: Subject to any disclaimer, the term of this patent is extended or adjusted under 35 U.S.C. 154(b) by 222 days.

(21) Appl. No.: 13/065,802

(22) Filed: Mar. 30, 2011

(65) Prior Publication Data

US 2011/0258765 A1    Oct. 27, 2011

Related U.S. Application Data

(60) Provisional application No. 61/308,612, filed on Apr. 1, 2010.

(51) Int. Cl.
*E03D 1/14*    (2006.01)
(52) U.S. Cl.
USPC .................. 4/362; 4/324; 4/411; 4/413
(58) Field of Classification Search ............... 4/324, 405
See application file for complete search history.

(56) References Cited

U.S. PATENT DOCUMENTS

| 2,283,678 | A  | * | 5/1942 | Landis | 4/411 |
| 7,975,322 | B1 | * | 7/2011 | Heller | 4/411 |

* cited by examiner

*Primary Examiner* — Tuan N Nguyen

(57) ABSTRACT

A controllable toilet flushing apparatus comprises an activating handle mechanism configured in a hollow housing assembly positioned under a toilet tank to be placed directly or indirectly over a toilet bowl; a hollow housing assembly where the activating handle mechanism and an outlet funnel are configured from within is manufactured to work with a mating sealed toilet tank or an open-top toilet tank; the activating handle mechanism comprises a horizontal shaft loaded with at least one torsion spring, a lift arm positioned under the outlet valve opening is attached to the horizontal shaft at the pivotal end and the other end can be attached to the outlet valve cap, at least one activating handle attached to the horizontal shaft end thereof to activate a flush by forcing the outlet valve cap lifted upwardly which allows water from the toilet tank to be discharged into the toilet bowl.

20 Claims, 6 Drawing Sheets

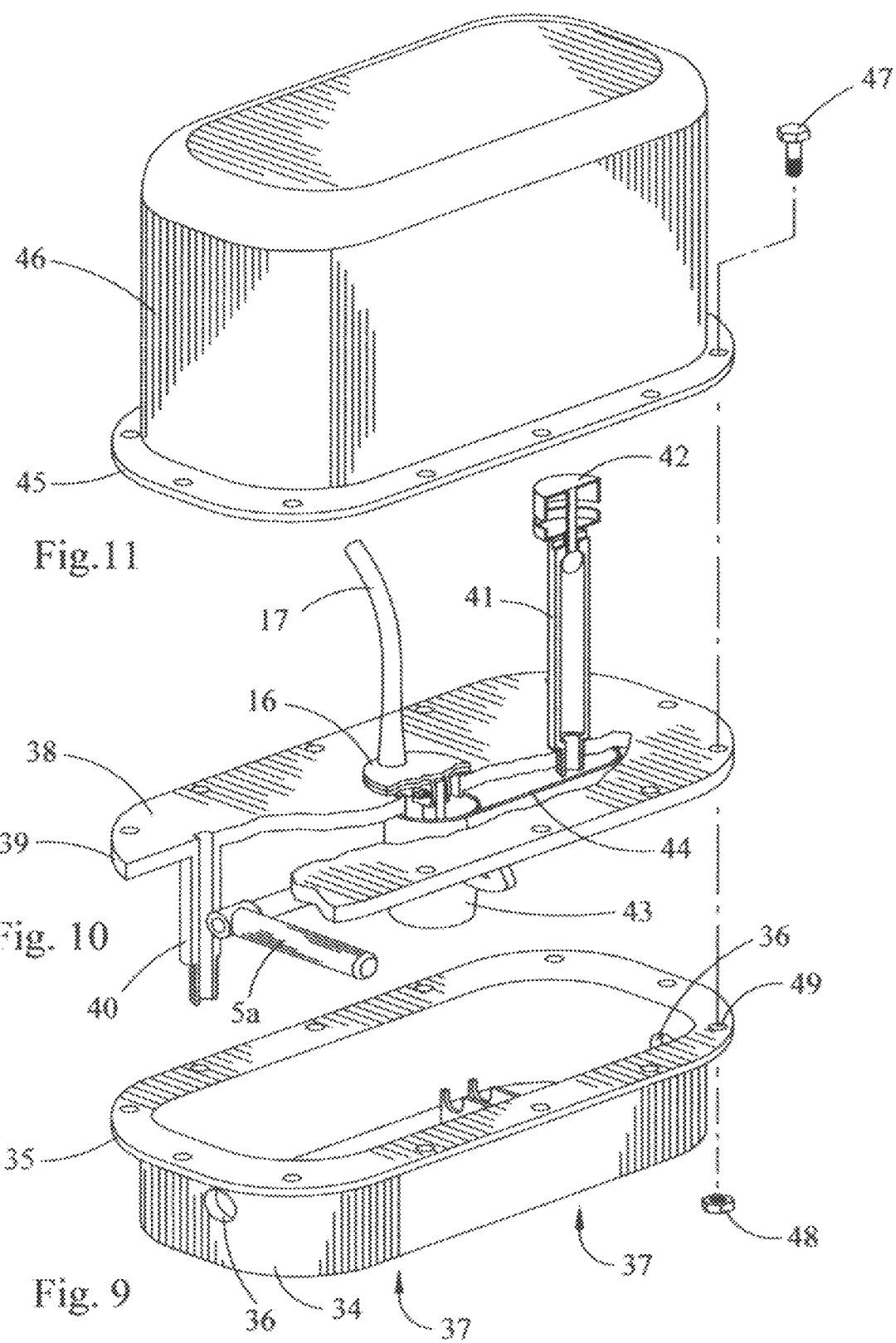

CONTROLLABLE TOILET FLUSHING APPARATUS

BACKGROUND OF THE INVENTION

The present invention relates to new and improved functionality of a toilet tank for use in association with a known toilet bowl.

Currently, most toilet tanks have open tops and are covered with removable lids. These are generally the older types that allow too much water flushing down into the drains when the flexible flapper with air pocket is activated to open and stop water when the flexible flapper is closed down to cover the outlet valve which is when the water tank is almost empty.

Other types of toilet tank have recently been available on the market and newly patented are engineered to be retrofitted inside hollow open-top tanks that contains one or two fixed amount of water volumes that is not sufficient to remove solid waste effectively.

Others such as compressed-air assisted water tank also retrofitted inside a known open-top toilet tanks often cannot flush solid waste away effectively and sometimes do not allow enough water to refill the required amount of water standing in the toilet bowl.

When a flush is not enough to remove solid waste from the toilet bowl, user has to wait for a few minutes for the water tank to be refilled, then user has to flush again and possibly again.

Most toilet tanks have no means for the user to completely control the amount of water being flushed as required at different situations.

To date, most toilets on the market are available at different range of prices. Some newly developed toilet systems may be costly and yet not work effectively.

It is therefore necessary to create a new method to control the amount of water needed to flush effectively for every situation: The activating handle mechanism configured in the hollow housing assembly positioned under an open-top toilet tank or a sealed toilet tank.

Furthermore, utilizing water pressure and some compressed air to generate a strong flush would definitely help when the activating handle mechanism configured in the hollow housing assembly is part of the sealed toilet tank.

The new controllable toilet flushing apparatus provides users full control of how much water they need to flush liquid or solid waste away effectively.

The new controllable toilet flushing apparatus, including the sealed toilet tank, can be configured to flush maximum of 1.6 gallon of water per flush which is required by the Governments. Less water may be used if the user releases the activating handle to stop the flush; therefore, it should be qualified as a High-Efficiency Toilet Apparatus.

Currently, there are many toilets in the homes and business places that are flushing from 3.5 gallons to 7 gallons of water per flush and many toilet tanks with those high volumes of water are on the market ready to be sold and installed. The new activating handle mechanism and its hollow housing assembly unit can be used or modified to use with those toilet tanks so that the user would have complete control of how much water should be used for each flush.

SUMMARY OF THE INVENTION

The present invention relates to controllable toilet flushing apparatus including an activating handle mechanism configured in the hollow housing assembly for use in combination with a sealed toilet tank or an open-top toilet tank in all of which to be placed over the toilet bowl directly or indirectly.

In one embodiment, the activating handle mechanism and its hollow housing assembly is used with the sealed toilet tank which delivers two types of water pressure in a flush with first portion of the flush contains pressurized-water pressure and a compressed-air kick and the remaining portion of the flush to be of gravity both combined to form a powerful flush to effectively push liquid and solid waste in the toilet bowl down into the drains using less water than the conventional open-top toilet tanks using flexible flapper with air pocket.

In another embodiment, the activating handle mechanism and its hollow housing assembly can be used with an open-top toilet tank utilizing normal gravity-fed water.

The activating handle mechanism with its hollow housing assembly can also be used with certain open-top toilet tank available on the market by having certain part modified or using adapters so that it would function accordingly.

The activating handle can be installed on the left or right side of the hollow housing assembly which is convenient for the user who is left-handed or right-handed. Two activating handles can be installed at the same time, with short activating handle installed horizontally so that the user can start the flush when she is still sitting, and/or installed vertically with a long activating handle so that the user can easily reach the activating handle when she stands up. The long activating handle can also be installed at any forward angle diagonally so that it can be easily reached by an elder or handicap.

In any case, the user has full control of how much water to be flushed for certain situations; therefore it is convenient for the user, and most importantly saves tremendous amount of water.

The controllable toilet flushing apparatus of the present invention may have its components modified to improve assembly, functionality and appearances. It is therefore contemplated that the patent claims will cover any such modifications or embodiments that may fall within the scope of the present invention as defined by the claims claimed.

BRIEF DESCRIPTION OF THE DRAWINGS

FIGS. 9, 10 & 11 shows cut-away and partially exploded views of a possible sealed toilet tank and the activating handle mechanism in its housing combined in one unit.

DETAILED DESCRIPTION OF THE INVENTION

The present invention shall be described with reference to FIGS. 1-11. Various embodiments of a controllable toilet flushing apparatus including an activating handle mechanism and its housing, a mating sealed toilet tank or an open-top toilet tank, and/or components thereof, according to the present invention.

The main object of this invention is to provide an activating handle mechanism configured in the hollow housing assembly which is placed under the sealed toilet tank or an open-top toilet tank so that users would have complete control of how much water they should use to effectively flush the liquid or solid waste away.

Figure 2:
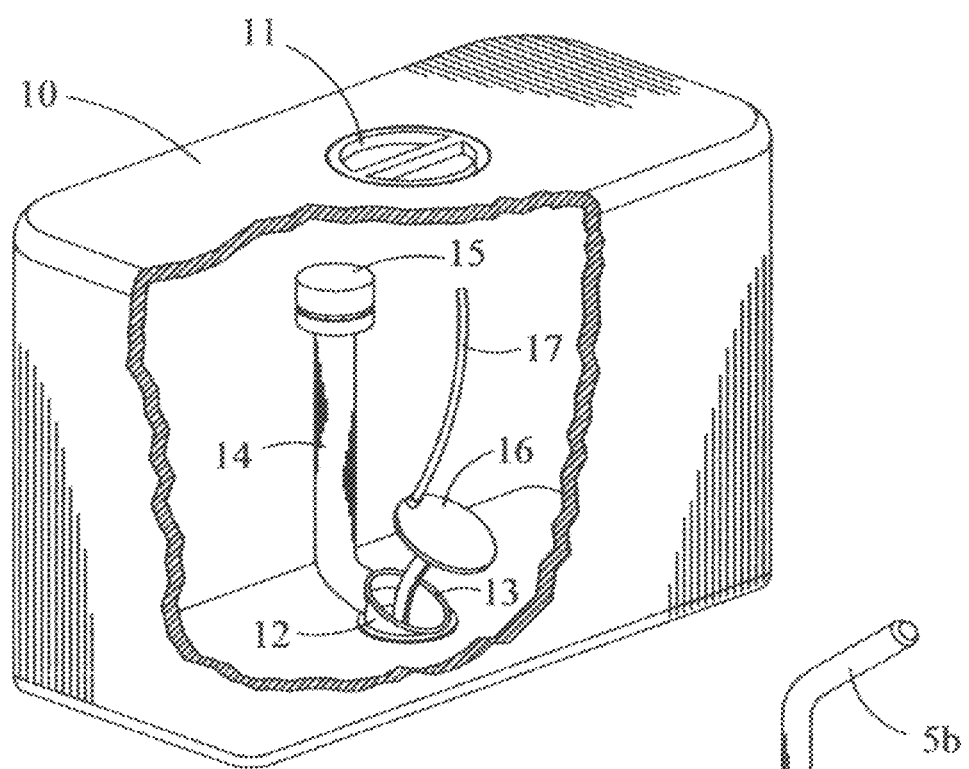
FIG. 2 is a cut-a-way sectional illustration of the sealed toilet tank with a sealed cap on top and a discharge assembly on the inside bottom.
Figure 3:
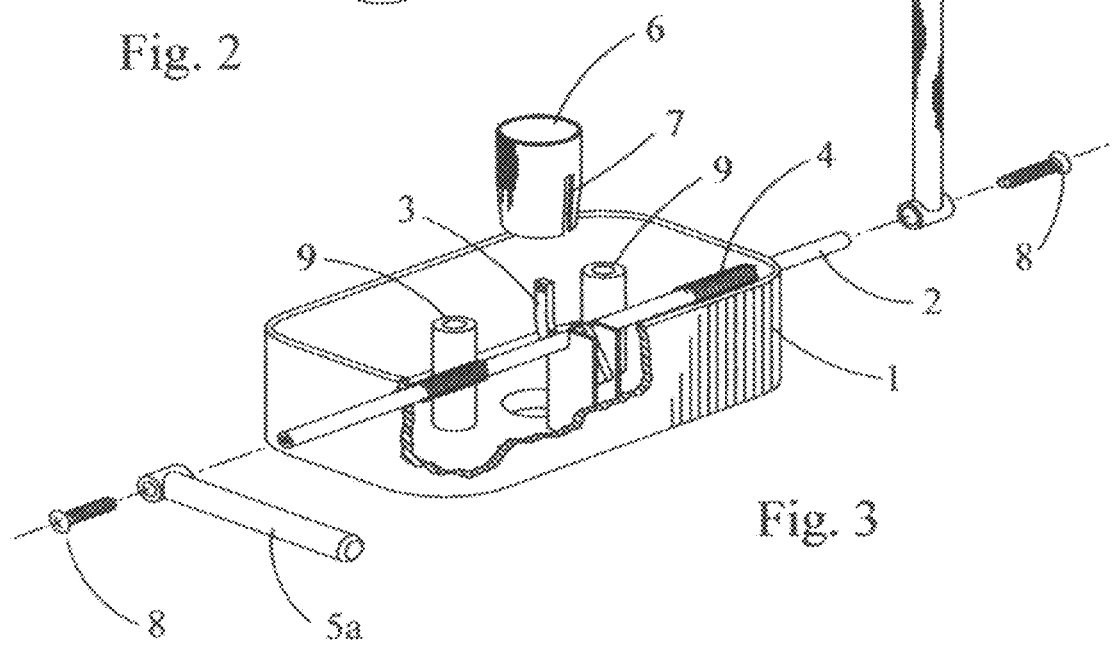
FIG. 3 shows the hollow housing assembly with the activating handle mechanism and the outlet funnel.
Figure 8:
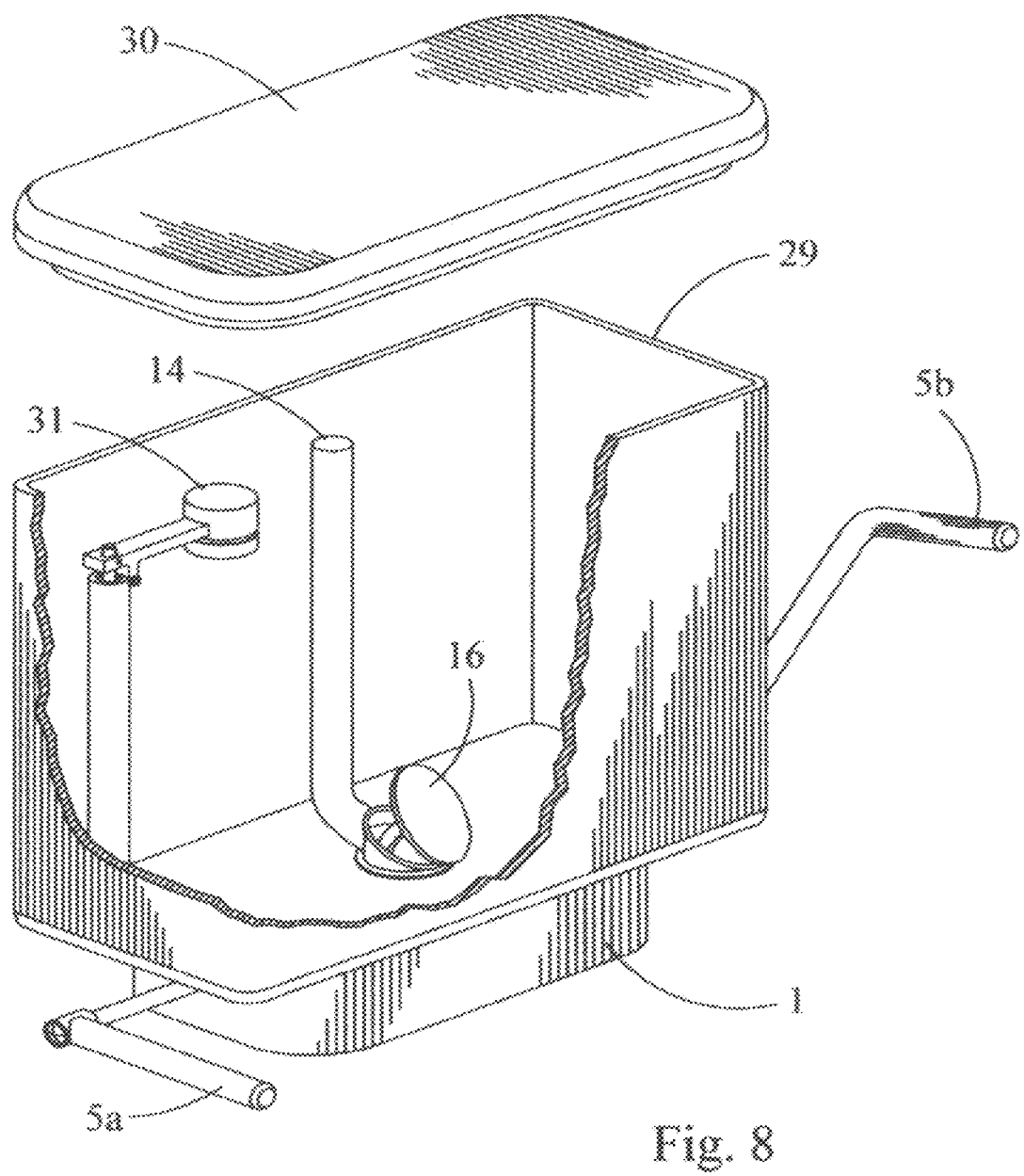
FIG. 8 shows the open-top toilet tank with the activating handle mechanism and the hollow housing assembly below. The components in the open-top toilet tank are similar to other type of toilet tank; however, the activating handle mechanism and its hollow housing assembly are incorporated so that the user can completely control the amount of water use for flushing.

A controllable toilet flushing apparatus according to preferred embodiments of the present invention comprises an activating handle mechanism, shown in FIG. 3, including a horizontal shaft 2, a lift arm 3, activating handles 5a and 5b; a hollow housing assembly 1, and an outlet funnel 6; a sealed toilet tank, as shown in FIG. 2, including a sealed high-pressured water reservoir 10, an access opening 28 with a high-pressured access cap 11, a discharge assembly 12 including an outlet opening with seal seat 13, a water-air release valve 14, a control head mechanism 15, an outlet valve cap 16, a compressed-air release tube 17 and other parts thereof; an open-top toilet tank, shown in FIG. 8, including an over-flow tube 14, a water inlet shutoff mechanism 31, an outlet valve cap 16 which is connected with the activating handle mechanism, shown in FIG. 3, positioned just below the open-top toilet tank; the activating handle mechanism and its hollow housing assembly can be used under a certain open-top toilet tank available on the market by modifying certain parts such as extending the lift arm 3, adding adaptors or even making some changes on the toilet tank.

Figure 1:
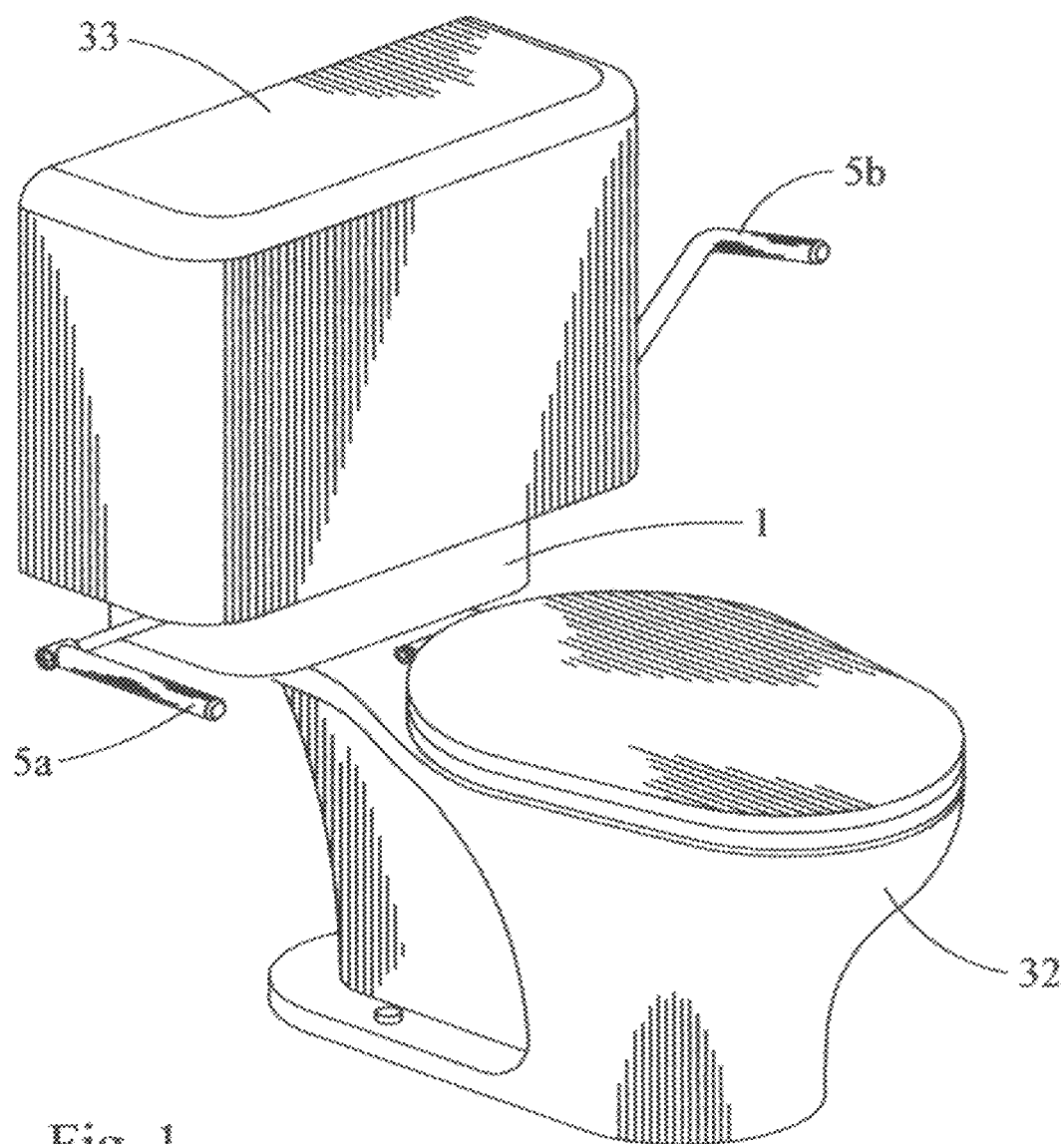
FIG. 1 is the placement of the controllable toilet flushing apparatus including an activating handle mechanism configured inside the hollow housing assembly with a toilet tank on top and a toilet bowl below.

The controllable toilet flushing apparatus, shown in FIG. 1, shows two activating handles installed. Activating handle 5a can be used when the user is sitting on the toilet seat, and the activating handle 5b can be used when the user is standing up. It can also be installed in any forward angle diagonally which can be easily reached by an elder or handicap.

Figure 4:
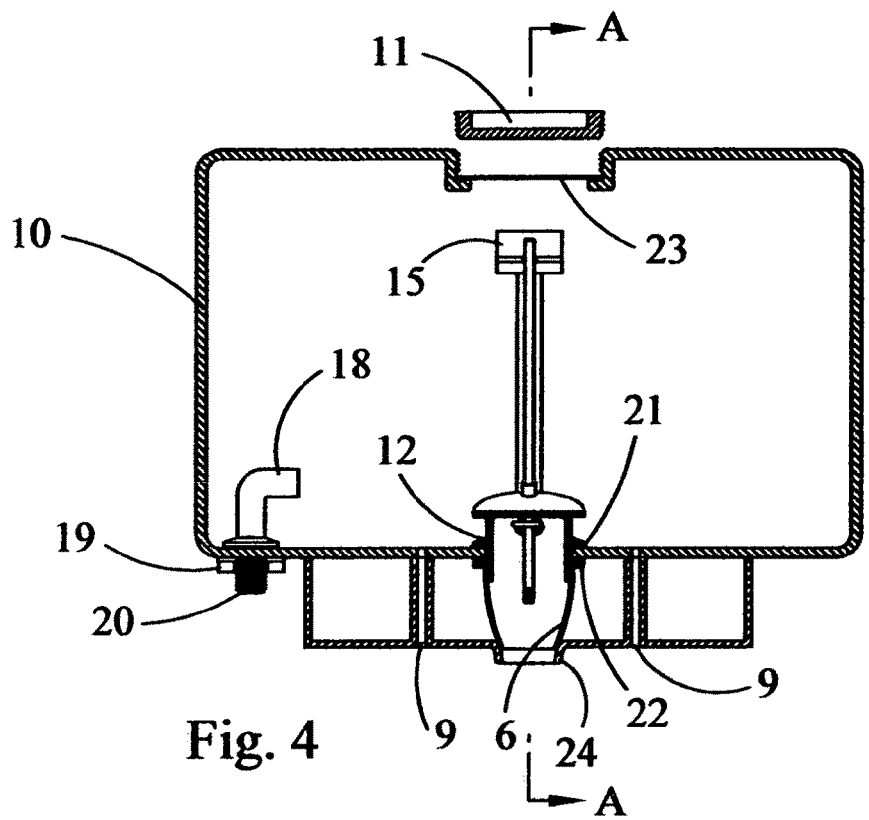
FIG. 4 is a vertical front section B-B of the hollow housing assembly and the sealed toilet tank together.
Figures 5, 6:
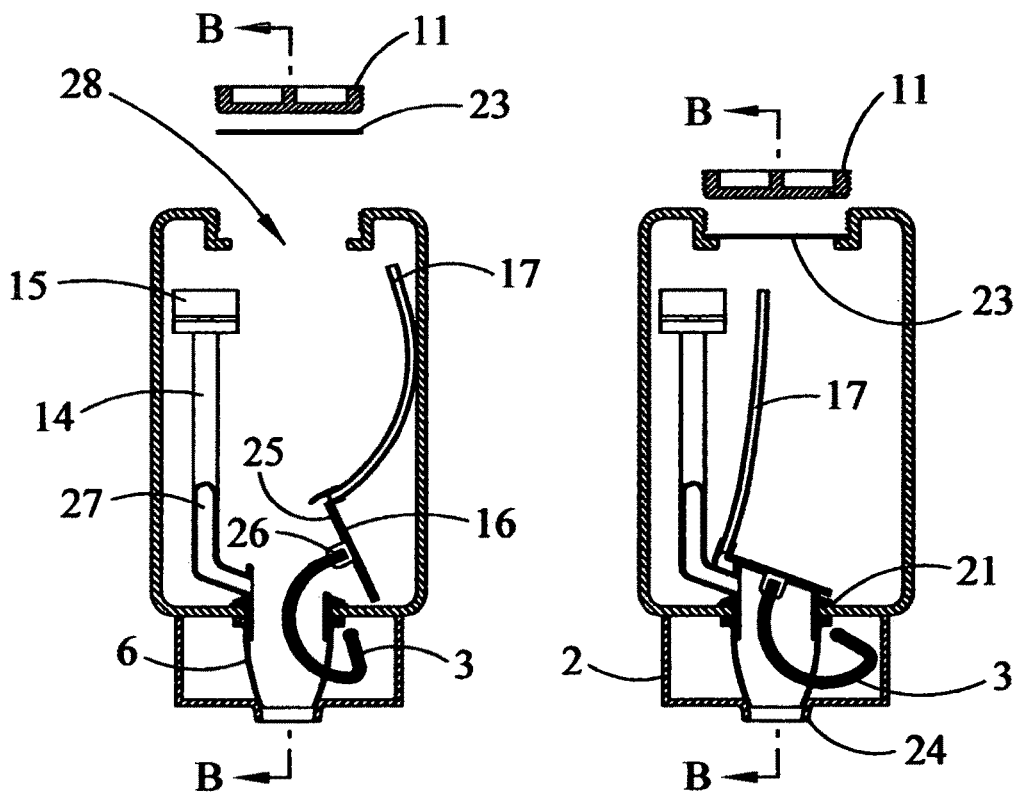
FIG. 5 is a vertical side section A-A of the hollow housing assembly and the sealed toilet tank together with the outlet valve cap being lifted in open position.
FIG. 6 is a vertical side section A-A of the hollow housing assembly and the sealed toilet tank together with the outlet valve cap being closed.
Figure 7:
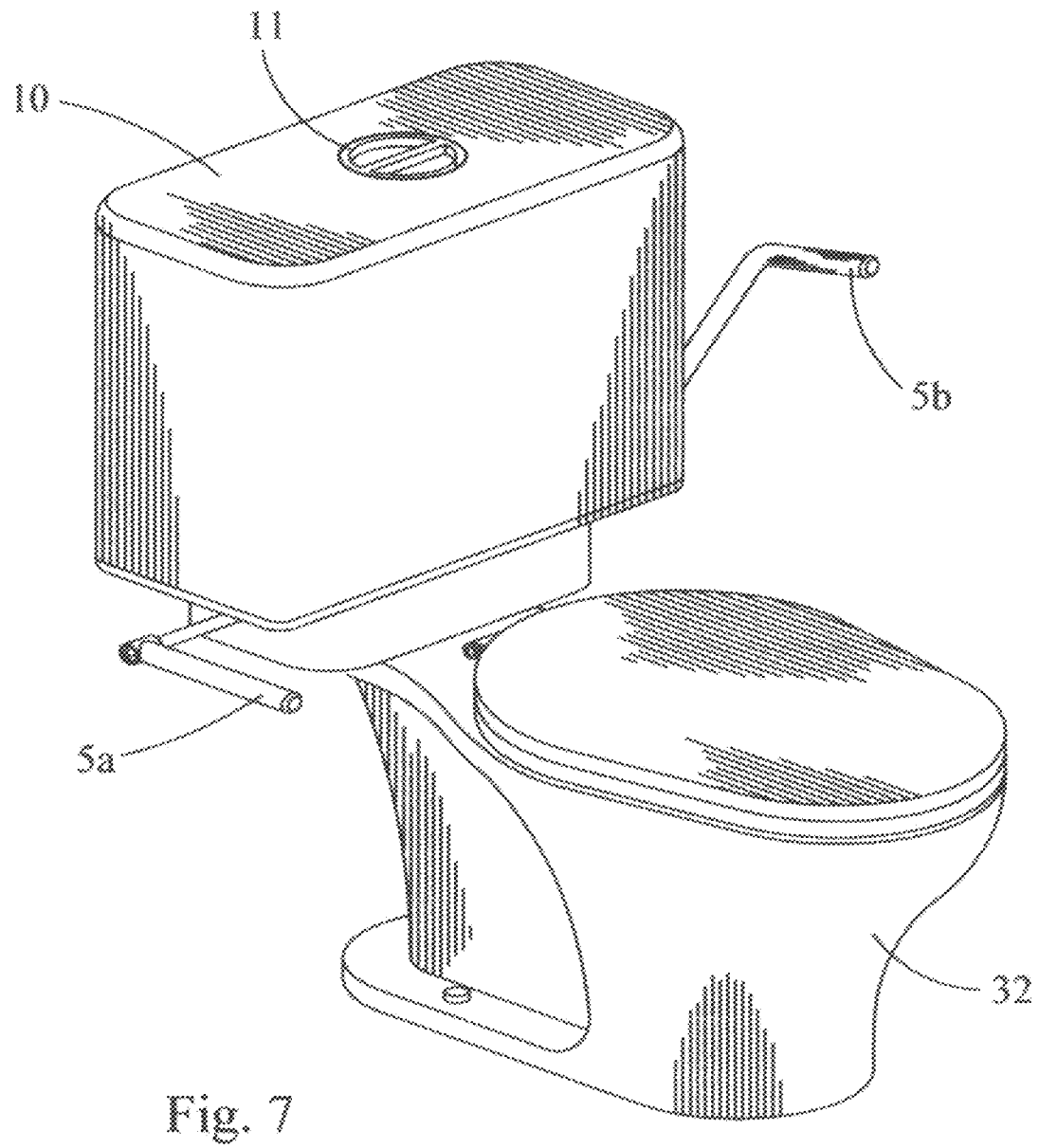
FIG. 7 shows the sealed toilet tank and the activating handle mechanism in the hollow housing assembly with two different handles installed.

The sealed toilet tank, shown in FIG. 2, is a high-pressured water reservoir 10, an access opening 28 with a high-pressured cap 11 which can be opened for repairing the discharge assembly 12, or replacing any part such as the outlet valve cap 16 or the compressed-air release tube 17, a seal gasket 11 as shown in FIGS. 4, 5 & 6, is used to prevent leaking. The sealed toilet tank 10 is fabricated with high-density plastic or other quality material to withstand high pressure at all times. The discharge assembly 12 includes the outlet valve seat 13 and outlet valve cap 16 and the water-air release valve 14 and a control head mechanism 15 are used to control the amount of water entering the reservoir 10, releasing some compressed air, and releasing a small amount of water to refill the standing water in the toilet bowl 32. In a preferred embodiment, the sealed toilet tank 10 can be manufactured to have a funnel-like bottom which helps channeling pressurized water downward efficiently.

The activating handle mechanism, shown on FIG. 3, includes a horizontal shaft 2, a lift arm 3, at least one torsion spring 4, at least one handle 5a and/or 5b to be installed with bolts 8, in all of which are configured from within the hollow housing assembly 1. This is the main component of the present invention to be used with mating sealed toilet tank 10 or an open-top toilet tank 29. Part of the hollow housing assembly 1 are two hollow cylinders 9 with holes that are lined up with ones on the sealed toilet tank 10 or open-top toilet tank 29 and also lined up with ones on the toilet bowl 32. The outlet funnel 6 is fabricated to be snapped onto the bottom opening of the discharge assembly 12. A cut-a-way on a side of the outlet funnel 7 is for the access of the lift arm 3 which is attached to the outlet valve cap 16. At the bottom of the hollow housing assembly 1 there is an outlet opening 24 for water to flow into the toilet bowl 32.

As seen on the front sectional view, FIG. 4, the mains-water inlet valve 18 are installed with a rubber washer inside and fastened with a nut 19. The remained threaded portion of the mains-water inlet valve 18 is for the attachment of the water inlet hose which is typical standard fitting. The discharge assembly 12 is installed with a seal gasket 21 and fastened to the base with a high density nut 22.

FIG. 5 shows side sectional view A-A. The water-air release valve 14 has a cut-a-way 27 theoretically to show the hollow valve, attached at the top is a control head mechanism to control water and compressed air being released to the outlet funnel 6. As when the lift arm 3 pushes the outlet valve cap 16 upward, the compressed-air release tube is raised up to the compressed-air space to release compressed air from the reservoir. The lift arm 3 is attached to the outlet valve cap 16 at the flange 26 under the outlet valve cap 16. A quality rubber layer 25 is permanently glued onto the bottom of the outlet valve cap 16 to give it a good seal preventing leaks.

FIG. 6 shows similar components as on FIG. 5, but with the outlet valve cap being closed.

The open-top toilet tank 29, shown in FIG. 8 with cut-a-way view, is similar to most open-top toilet tanks available on the market or ones being installed in most homes and business places. The big difference is the outlet valve cap 16, similar to the rubber flapper used in most toilet tank, is being lifted by the activating handle mechanism positioned in the hollow housing assembly below the outlet valve cap. The over-flow valve 14 and the mains-water inlet valve with a float 31 to stop water when full is the same as other water inlet mechanism currently being used on many open-top toilet tanks with lids 30.

FIGS. 9, 10 & 11 show a variation of the controllable toilet flushing apparatus. The whole unit has functions as claimed in the sealed toilet tank 10; however, in a different housing assembly. The bottom hollow housing 34 with a flange 35 for fastening to the flange on the center panel 38 and flange on the water chamber 46, all being fastened together with nuts 47 and bolts 48 through the mating holes 49. The holes 36 are for the horizontal shaft 2 of the activating handle mechanism configured in the bottom hollow housing 34. Underneath the bottom hollow housing 34 to have two bolt head channels 37 for the bolt heads to slide in and fastened to the toilet bowl 32. The center panel 38 to have the activating handle mechanism including the horizontal shaft 2, lift arm 3, activating handles 5a and 5b fastened to the horizontal shaft 2 by bolts 8, outlet valve cap 16 with attached compressed-air release tube 17, water-air release valve 41 with a control head mechanism 42 that can be installed away from the outlet valve seat 13 which is a variation of the control head mechanism 15.

Although the present invention has been shown and described with respect to the preferred embodiments, it will be understood by those skilled in the art that various changes and modification may be made without departing from the spirit and scope of the invention as defined in the claims.

The invention claimed is:
1. A controllable toilet flushing apparatus includes an activating handle mechanism configured in the hollow housing assembly under a sealed toilet tank or an open-top toilet tank; the controllable toilet flushing apparatus comprising: an activating handle mechanism, a hollow housing assembly where the activating handle mechanism is configured from within to open and close the discharge assembly which includes an outlet valve cap, an outlet valve opening with an outlet seal seat incorporated, a water-air release valve and control head mechanism, an outlet funnel to channel water from the toilet tank to the toilet bowl, wherein the outlet funnel is in communication with the outlet valve opening, the outlet valve cap, the water-air release valve mechanism, and the curved arm which is part of the activating handle mechanism; the sealed toilet tank is a high-pressured water reservoir to hold water and compressed air ready for flushing, said sealed toilet tank to have at least one panel for use in enclosing top wall, side walls and bottom wall, said top wall to have one access opening to be sealed with a gasket and locked with a high-pressured cap, said side walls to be formed in any shape enclosing the sides, preferably in a spherical cylinder for pressure holding strength, said bottom wall to have one outlet opening for the discharge assembly to be installed to, said outlet valve cap to have a compressed-air release tube incorporated to release compressed air trapped inside the sealed toilet tank when the activating handle is activated to lift the outlet valve cap upwardly, a water-air release valve with a control head mechanism is incorporated as part of the outlet opening valve for use in the sealed toilet tank, said control head mechanism is configured to allow water in the sealed toilet tank to reach certain desirable level by letting some compressed air escaped through the water-air release valve and by letting some water entered the water-air release valve and flowed down to refill the standing water needed in the toilet bowl, as when the water pressure is low, the water-air release valve would work as the overflow tube until the pressure is increased, then the float on the control head mechanism is automatically activated to stop both compressed air and pressurized water from escaping, and one opening as mains water feed valve for mains-water feed to enter the water reservoir until water reservoir reaches its desirable capacity; the hollow housing assembly with an activating handle mechanism is positioned directly below the sealed toilet tank, as when the activating handle mechanism is activated to open the outlet valve cap, the first portion of the flushed water with pressurized-water pressure combining with a compressed-air kick turbulently flows into the outlet funnel and into the toilet bowl, this strong portion of the flush should effectively push the content in the toilet bowl away; whereas when the activating handle is being depressed or pulled and the outlet valve cap is in upward position, compressed air trapped inside the reservoir is released through the compressed-air release tube attached at the top of the outlet valve cap, pressurized-water pressure instantly changes into gravity pressure on the remain portion of the same flush; the activating handle mechanism with its hollow housing assembly is also usable with an open-top toilet tank; the activating handle mechanism has at least one activating handle on the left and/or right side of the hollow housing assembly; a decorative cover is used to cover the sealed toilet tank to achieve certain appearance, such as matching with the toilet bowl in term of material, color and/or finish.

2. The controllable toilet flushing apparatus according to claim 1, wherein comprises an activating handle mechanism configured in the hollow housing assembly to open and close the outlet valve cap placed on the outlet valve seat which is part of the discharge assembly, said activating handle mechanism comprises a horizontal shaft loaded with at least one torsion spring, an attached curved arm to lift the outlet valve cap upward when activating the flush, at least one activating handle is attached to the outer end of the horizontal shaft.

3. The controllable toilet flushing apparatus according to claim 1, wherein comprises a sealed toilet tank which is a high-pressured water reservoir operated by an activating handle mechanism positioned directly below in the hollow housing assembly, said sealed toilet tank to have one access opening to be sealed and locked with a high-pressured cap, an open mains-water inlet valve for continuous feeding, a discharge assembly which includes an outlet valve opening with a seal seat, a water-air release valve with a control head mechanism installed at the upper end, and an outlet valve cap with an attached compressed-air release tube.

4. The sealed toilet tank according to claim 3, wherein is a high-pressured water reservoir which generates a combination of high pressure and gravity in two stages of a fully controllable flush that is activated by at least one activating handle mechanism positioned outside of the water reservoir, as when the activating handle mechanism is activated to open the outlet valve cap, the first portion of the flush with pressurized-water pressure combining with a compressed-air kick which helps to push water turbulently down through the outlet funnel and into the toilet bowl; whereas when the activating handle is being depressed or pulled and the outlet valve cap is in open position, compressed air trapped inside the reservoir is released through the compressed-air release tube and the water-air release valve, pressurized-water pressure instantly changes into gravity pressure on the remain portion of the same flush; the activating handle permits the user the full control of how much water to be discharged from the water reservoir to the toilet bowl; said water reservoir to have at least one open mains-water feed valve to continuously feed the water reservoir, an outlet valve opening with an outlet valve seat to release water through the outlet funnel and into the toilet bowl, a water-air release valve with a control head mechanism is configured to allow a small amount of water to be released to the toilet bowl, as when water in the water reservoir reached certain desirable level, some compressed air escaped through the water-air release valve and by letting some water entered the water-air release valve and flowed down to refill the standing water needed in the toilet bowl, when the flush is stopped and the water reservoir is filled to its capacity, the control head mechanism automatically activates to stop both compressed air and pressurized water from escaping; a compressed air release tube is incorporated as part of the outlet valve cap for compressed air inside the water reservoir to be released as when the activating handle is activated to lift the outlet valve cap upwardly.

5. The activating handle mechanism according to claim 2, wherein consists of at least partially-rotatable horizontal shaft loaded with at least one spring preferably at least one torsion spring, a lift arm, at least one activating handle attached to at least one horizontal shaft end by any means and positioned outside of the hollow housing assembly preferably on the left and or right side.

6. A discharge assembly according to claim 1, wherein the discharge assembly comprises a water-air release valve with an add-on control head mechanism for use in the sealed toilet tank, an outlet valve opening with an outlet seal seat incorporated thereof, an outlet valve cap, and an outlet funnel; said discharge assembly to be installed to the outlet opening at the bottom of the toilet tank by at least one seal gasket and at least one mating nut; said outlet seal seat may be slanted or horizontally set.

7. The sealed toilet tank according to claim 1 to have a water-air release valve with a control head mechanism installed to specifically control the mains-water feeding flow, water and air releasing; said water-air release valve is part of the discharge assembly with the hollow bottom end open to the outlet valve opening.

8. The access opening according to claim 3, wherein on top wall of the sealed toilet tank to have an access opening about four inches in diameter, said access opening to be sealed with a high-pressured cap which is fastened and/or locked onto the access opening with a seal gasket to ensure no leaking.

9. The hollow housing assembly according to claim 2, wherein in another embodiment to be manufactured to be part of the sealed toilet tank or an open-top toilet tank.

10. The high-pressure water reservoir according to claim 4, wherein further comprising in a possible embodiment to be manufactured as a component to be retrofitted to fit into an open-top toilet tank and works proficiently with its mating activating handle mechanism in the hollow housing assembly unit below.

11. The hollow housing assembly according to claim 2, wherein in a preferred embodiment to be filled with material such as foam or plastic; said housing assembly can be solid with cut-way cavities for the activating handle mechanism, outlet funnel and fastening bolts.

12. The activating handle according to claim 2, wherein to have handle design extended at any length forward horizontally, upward vertically, and/or extended diagonally at any angle frontward.

13. The outlet funnel according to claim 6, wherein to have at least one cut-away opening for the access of the lift arm, said outlet funnel may include a channel which allows some water coming from the water-air release valve, if the water-air release valve is placed away from the outlet valve opening, to allow overflow water to flow to the toilet bowl in order to refill the required standing water in the toilet bowl.

14. The hollow housing assembly according to claim 2, wherein contains at least two hollow cylinders for two bolts fastening the sealed toilet tank or an open-top toilet tank to the toilet bowl when installed directly.

15. The outlet valve cap according to claim 3, wherein the outlet valve cap is fabricated with a rigid plastic material at the top layer to withstand high pressure and with a rubber material at the bottom layer to form a tight seal at the outlet valve seat thus preventing leakage; said outlet valve cap to have a hole with fitting near the edge for the attachment of the compressed-air release tube as part of the outlet valve cap to release compress air inside the water reservoir, as when the outlet valve cap is lifted, the upper end of the compress-air release tube reached the compressed air space which instantly allows compressed air to be released, therefore causes the flush to be turbulently discharged, said outlet valve cap to include a receptacle in the middle for the lift arm to be attached or fastened to from below.

16. The sealed toilet tank according to claim 4, wherein in a possible embodiment to have two water reservoirs controlled by two separate activating handle mechanisms configured in the hollow housing assembly under the toilet tank.

17. The sealed toilet tank according to claim 4, wherein in a preferred embodiment the mains-water feed valve to have at least one pipe leading mains-water feed to the outlet opening wherein to directly feed the flush with high pressured water from the mains-water feed pipe and the high pressured water reserved in the reservoir combined with a compressed-air kick to generate a powerful flush.

18. The sealed toilet tank according to claim 4, wherein further comprises in another preferred embodiment to have an air inlet funnel attached to the bottom and next to the outlet valve opening to bring air from the hollow housing assembly to the compressed air space in the water chamber which instantly allows water to turbulently discharged without making wobbling noise.

19. The sealed toilet tank according to claim 3, wherein in another preferred embodiment to be configured and placed away from the toilet bowl such as being placed in the wall at certain height behind the toilet bowl or be placed at other location in any of which to have a pipe connected from the outlet funnel under the hollow housing assembly to the mating inlet opening on the toilet bowl.

20. The controllable toilet flushing apparatus according to claim 1, wherein comprises a decorative cover made of same material, color and/or finish as on the mating toilet bowl or with different material, color and/or finish.

\* \* \* \* \*